Feb. 23, 1965 W. L. ADAMS 3,171,073
SERVO AMPLIFIER CONTROL SYSTEM
Filed Feb. 1, 1961
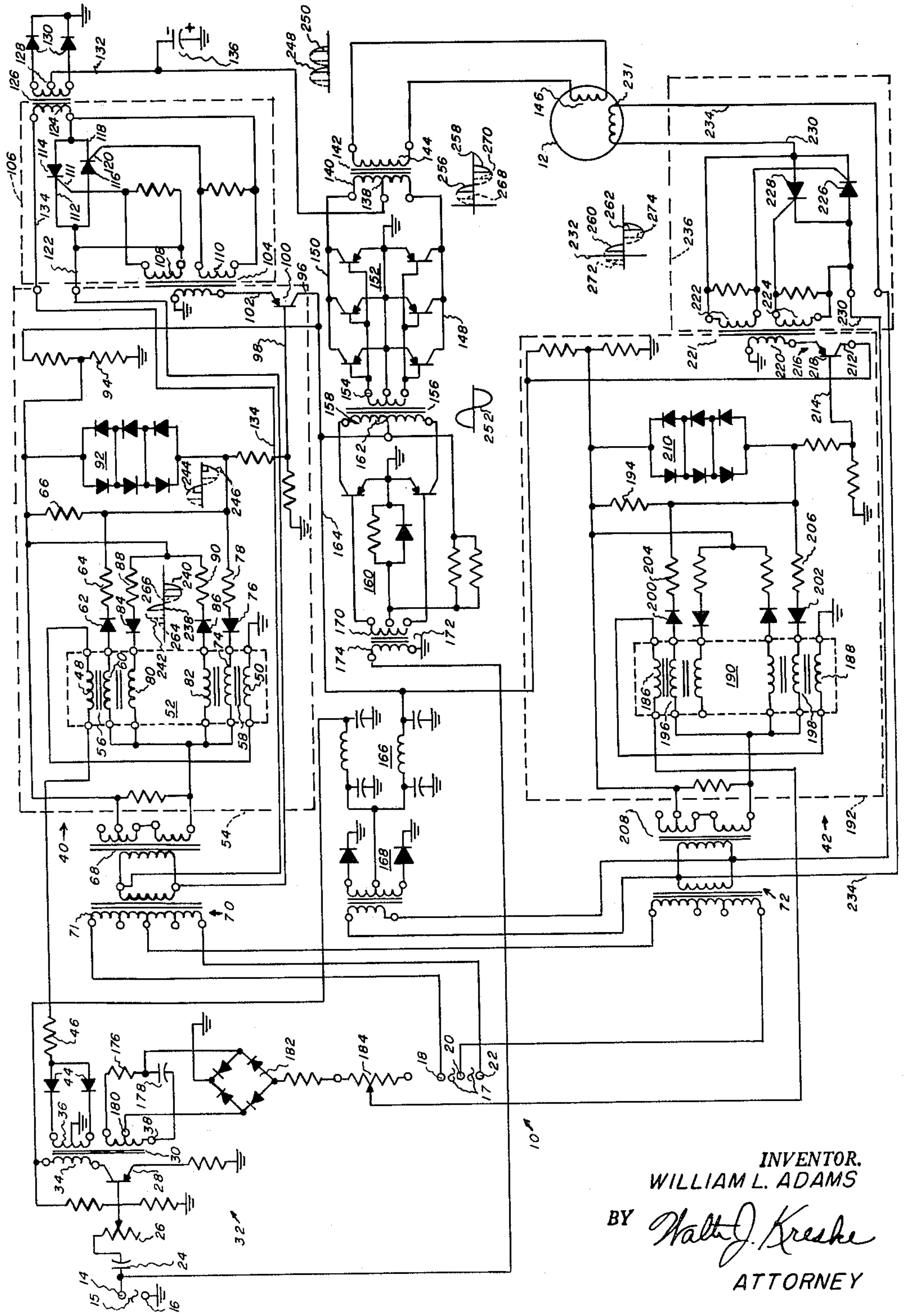
INVENTOR.
WILLIAM L. ADAMS
BY Walter J. Kreske
ATTORNEY 3,171,073
SERVO AMPLIFIER CONTROL SYSTEM William L. Adams, Lafayette, Ind., assignor to General Electronic Laboratories, Inc., Cambridge, Mass., a corporation of Massachusetts Filed Feb. 1, 1961, Ser. No. 86,435
13 Claims. (Cl. 318—207)

This invention relates to power amplifiers and more particularly to alternating current power amplifiers for two phase operation and particularly suitable for servo motor control.

One of the requirements peculiar to alternating current servo-motors is that the power supply be of a two phase type. Such servo-motors require two sources of power, one for supplying power to a reference winding and the other for supplying power to a control winding in the servo-motor. If there is no power on either winding, there will be no rotational torque. The power supply to the control winding must be controllable in amplitude and in addition the control and reference windings must be maintained in quadrature, that is 90 degrees out of phase in voltage with each other. High powered servo-motors, that is those of approximately 200 watts and above, have even a more serious problem in that the voltage applied to the reference winding cannot be left at full value under stall conditions due to resulting overheating and burnout because the extra power cannot be dissipated.

Existing equipment capable of supplying both the control winding and the reference winding with suitable voltages have been inefficient from the point of view of power loss and have had substantial dead space in the phase reversal region for changing rotation of the servo motor from one direction to another. Attempts at increasing the efficiency by use of duty cycle control techniques have resulted is accentuating the undesirable dead space region. These methods normally also introduce undesirable non-linear control functions.

These problems have been overcome in the present invention of a power amplifier control which also has other desirable features and advantages. Among the other desirable features, and advantages, besides high efficiency and fine linearity with virtually no phase reversal dead space, are an amplifier which maintains accurate quadrature conditions at the outputs of the amplifier under all operating output voltage conditions. Another desirable feature of the present invention is that it is not only highly applicable and desirable for use in low and moderate power output servo-motors and other loads but also applicable to loads such as servo motors requiring servo-motor output power of 200 watts and more, necessitating amplifier output power which may be four times that large. Another desirable feature is that the present invention is particularly applicable to high power output and is limited only by transistor current limitations and even with such present limitations, output power of at least 2 kilowatts can be obtained.

A primary object of the present invention is the provision of a two phase amplifier control device which is capable of high efficiency of operation.

Another object is the provision of a two phase amplifier control device having capability of extremely wide range of power output from low through high with good linearity in the low power output region as well as the high power region and entire range therebetween.

Another object is the provision of a two phase amplifier control device having capability of high power output with essentially no dead space in the phase reversal region over the entire range from low power through high power output.

A further object is the provision of a two phase amplifier control device which achieves or provides quadrature output voltage to a high degree of accuracy over the entire operating range, including high and low power output conditions.

And a further object of the present invention is the provision of a two phase amplifier control device having an extremely rapid response to control changes.

And a still further object is the provision of a two phase power amplifier control circuit having a response bandwidth comparable to that of conventional vacuum tube or transistor power amplifiers.

These objects, features and advantages are achieved generally by providing a converter structure having a pair of outlets for supplying alternating current power in quadrature phase, a duty cycle controller for each of the outlets, each duty cycle controller having two inputs and one output, one of the inputs coupled to a respective one of the quadrature phase outlets, the other input adapted for coupling to a master control signal source, a linear power amplifier coupled to the output of one of the duty cycle controllers, and a structure adapting the other duty cycle controller output for coupling to a load.

By making the power amplifier in the form of a push pull transistor amplifier, linear control in the low power region as well as high power amplifier capability is thereby achieved. The high power capability is primarily due to the low saturation resistance characteristic of the transistors under high signal conditions.

By providing a plurality of transistors in parallel in the push pull amplifier circuit, increased high power capability is thereby achieved without substantial sacrifice in linear operational control under low power conditions.

By making the push pull transistor amplifier in the form of a class B amplifier a high degree of efficiency of operation is thereby achieved without a substantial degradation of performance.

By providing a center tap primary in the output of the transistor amplifier with the center tap coupled to a full wave rectifier duty cycle controller with high power capability in the duty cycle controller, the overall control power characteristic is thereby achieved for one of the channel outlets.

These and other objects, features and advantages will be better understood from the following description taken in connection with the accompanying schematic drawing of a preferred embodiment of the invention. Referring to the drawing in more detail, an amplifier control device made in accordance with the present invention is designated generally by the numeral 10. The amplifier control device 10 is illustratively arranged for operating a servo-motor 12 in accordance with a control signal 15 applied between control signal input terminals 14 and 16 selectively in two modes, one being that of positioning the servo-motor 12, and the other being that of speed and rotational control in either of the two possible rotational directions. This two mode control is effected by the amplifier control device 10 in connection with an alternating current power source 17 coupled to the terminals 18, 20 and 22 providing three phase alternating current. To achieve such control, the control signal input from the terminal 14 appears through a coupling capacitor 24 through a potentiometer 26, a transistor 28 and transformer 30 in a control signal amplifier 32 having a primary 34. The transformer 30 has two secondaries 36 and 38 each feeding a separate one of two duty cycle control channels 40 and 42. The control signal 15 is fed from the secondary 36 through a full wave rectifier pair 44 and a current limiting resistor 46 to the control windings 48 and 50 in a magnetic amplifier 52 in a duty cycle generator 54 in the duty cycle control channel 40. The magnetic amplifier 52 may be of conventional design having a pair of transformers 56 and 58 each with three windings. The transformer 56, in addition to the control winding 48 has a power winding 60 coupled through a rectifier 62, a resistor 64 and a load resistor 66 through one side of a step down power transformer 68 as take off from a Scott T configuration transformer 70 whose primary 71 is coupled to the three phase input terminals 20 and 18. The Scott T configuration consists of transformers 70 and 72 which are coupled to the three phase power input terminals 18, 20 and 22.

Similarly, the transformer 58 in the magnetic amplifier 52 has a power winding 74 coupled through a rectifier 76, resistor 78 to the load resistor 66. The transformers 56 and 58 each have third windings which are reset windings 80 and 82 respectively coupled through rectifiers 84 and 86, and reset resistors 88 and 90 respectively to the output of the step down transformer 68. Across the load resistor 66 are coupled parallel diode chains 92, the number of such rectifier chains being determined by the amplitude of the clipped signal desired. The rectifier chains 92 are also coupled through a resistor chain 94 across a collector 96 and base 98 of an emitter follower transistor amplifier 100. The emitter 102 of the transistor amplifier 100 is coupled to ground through the primary of a coupling transformer 104 in a duty cycle controller circuit 106 in the duty cycle control channel 40.

The coupling transformer 104 has two secondaries 108 and 110 which serve as driver windings for a pair of controlled rectifiers 114 and 116. The secondary 108 is coupled across control terminal 111 and cathode 112 of the controlled rectifier 114. The secondary 110 is coupled across the cathode 118 and control terminal 120 of the controlled rectifier 116. The controlled rectifiers 114 and 116 are in parallel with one end coupled to power line 122 and the other end coupled to one side of a primary 124 of a step down power transformer 126 having a secondary 128 with a full wave rectifier pair 130 for providing direct current output in centertap line 132 for purposes to be hereinafter further described. The power line 122 is coupled back to one side of the output of the Scott T configuration transformer 70, the other output side of which is coupled through a line 134 to the other side of the primary 124 for providing power to the step down power transformer 126.

The centertap line 132 is coupled through a filtering hash suppression capacitor 136 to ground and to a center tap 138 on the primary 140 of a power output transformer 142 having a secondary 144 coupled across control field winding 146 in the servo-motor 12. The primary 140 of the power output transformer 142 is coupled across collector lines 148 and 150 of a parallel array of transistors forming a push pull amplifier 152 with the base lines coupled across a transformer secondary 154 of an amplifier input transformer 156 for the amplifier 152. The amplifier 152 is arranged in the form of a class B push pull amplifier to provide desirably high efficiency of operation.

The amplifier input transformer 156 has a primary 158 coupled across a conventional class AB transistor power amplifier 160 and having a center tap 162 coupled to a direct current power line 164 from filtered power circuit 166 of a direct current power supply 168.

The input of the class AB amplifier 160 is coupled across a secondary 170 of an input coupling transformer 172 having a primary 174 coupled to control signal terminal 14 at the source of the control signal 15.

In order to insure proper operation, the control signal 15 must have a phase relationship substantially the same as or 180 degrees out of phase with the power output of the transformer 70 in the Scott T configuration and will be hereinafter further described.

The secondary 38 of the control signal amplifier 30 has a phase shifting network consisting of a resistor 176 and capacitor 178 coupled in series across it and a center tap 180 coupled through a full wave rectifier bridge 182 and a potentiometer resistor chain 184 to control windings 186 and 188 of a magnetic amplifier 190, similar to the magnetic amplifier 52, in a duty cycle generator 192 in the duty cycle control channel 42. The construction of the duty cycle generator 192 may be identical with the construction of duty cycle generator 54 in the duty cycle control channel 40 and has a similar load resistor 194 fed by magnetic amplifier power windings 196 and 198 respectively through rectifiers 200 and 202 and resistors 204 and 206 respectively. The magnetic amplifier power windings and load resistors 194 are coupled to the output side of a power transformer 208 at the Scott T configuration transformer 72 in a manner similar to the power transformer 68 at the Scott T configuration transformer 70.

A parallel rectifier chain 210 similar to rectifier chain 92 is coupled across the load resistor 194. The rectifier chain 210 is also coupled across a collector 212 and base 214 of a transistor amplifier 216 in similar manner and similar to the transistor amplifier 100. The transistor 216 has an emitter 218 coupled to one side of a primary 220 of a coupling transformer 221, the other side of which is coupled to ground. The coupling transformer 221 may be similar to the coupling transformer 104 and similarly has two secondaries 222 and 224 having the function of driving controlled rectifiers 226 and 228 respectively. The controlled rectifiers 226 and 228 are arranged in parallel in power line 230 for full wave control of power to a second field winding 231 in the servomotor 12. The power line 230 is tied back to one side of the output of transformer 72 in the Scott T configuration, the other output side of which is coupled through a power line 234 to the other side of the field winding 231.

The coupling transformer 221 and controlled rectifiers 226 and 228 with associated circuitry form a duty cycle controller circuit 236 similar to the duty cycle controller circuit 106 except that the output of the duty cycle controller circuit 106 is fed through the transformer 126 to the power amplifier circuit 152, while the duty cycle controller circuit 236 is coupled directly to the servomotor 12.

In the operation of the power amplifier control device 10 the alternating current control signal 15, substantially in phase or 180 degrees out of phase with the output of the transformer 70, is applied across the control terminals 14 and 16. The control signal 15 is amplified by the transistor amplifier 28 to a level set on the potentiometer 26 and fed through the coupling transformer 30 simultaneously through the secondary 36 to the control windings 48 and 50 of the magnetic amplifier 52 and through the secondary 38 and rectifier bridge 82 to the control windings 186 and 188 of the magnetic amplifier 190 in the duty cycle generators 54 and 192 respectively.

The magnetic amplifier 52 operates in conventional manner of magnetic amplifiers. The values of the reset resistors 88 and 90 have been selected to be of such reset value that when there is no input signal 15 reaching the control winding 48, the firing conduction portion of the cycle in the present instance consists preferably of the last 60 degrees of each cycle schematically designated by the numbers 238 and 240 where the curve 242 represents the outline of a full voltage cycle. The conduction portions 238 and 240 of the alternating current cycle 242 provides a residual control signal across the load resistor 66 and the clipping circuit 92 feeding through the transistor amplifier 100 and the coupling transformer 104 to the control terminals 111 and 120 of the controlled rectifiers 114 and 116 to thereby control the amount of power fed from power lines 134 and 122 through the transformer 126 to the center tap 138.

The residual control signals appearing across the load resistor 66 from the residual power designated by the areas 238 and 240 which occur when there is no input signal 15 are clipped by the rectifier chain 92 and appear as the clipped residual control signals 244 and 246. The rectifier chain 92 thereby also provides protection to the controlled rectifiers 114 and 116 from excessive voltage signals. During these brief periods of the clipped residual control signals 244 and 246 to the controlled rectifiers 114 and 116, power is supplied through the power lines 122 and 134, through the power transformer 126 to the center tap 138. At the center tap 138, the voltage wave form for this residual condition will appear as two positive pulses 248 and 250 and represent available power during the residual condition.

The diodes 44 are preferably silicon diodes which thereby have a small voltage delay as their forward conduction characteristic. In the present instance this delay is such that as the voltage of the control signal 15 rises from zero to one half volt, as measured at the output of the secondary 36, it will not cause current flow through the rectifiers 44 and therefore it will have no affect upon the operation of the magnetic amplifier 52. However, during this low control voltage period pulses 248 and 250, as stated above, represent the available residual condition power at the center tap 138 for application to the control winding 146 in the servo-motor 12. The class AB amplifier 160 and the class B amplifier 152 in response to the low voltage portion of the control signal 15 provide a corresponding alternating voltage across the primary 140 of the power transformer 142. The control signal 15 across the terminals 14 and 16 is fed through the transformer 172 to the class AB amplifier 160 where it is amplified and caused to appear across the primary 158 as an alternating voltage signal 252. The alternating voltage signal 252 thus is fed through the transformer 156 to the class B amplifier 152. However, because the class B amplifier 152 has as its sole source of power the signals 248 and 250 described above there will be no amplification in the class B amplifier 152 except during the appearance of the signals 248 and 250 to thereby produce across the primary 140 an alternating voltage shown by the solid line curves 256 and 258 which are similar to the curves 248 and 250 except in that the voltage amplitude is determined by the magnitude of the input control signal 15 as amplified in the two amplifiers 160 and 152. The phase relationship is also determined by the phase of the input signal 15. The voltage wave forms 256 and 258 will appear through the transformer 142 at the control winding 146 of the servo-motor 12 to cause rotary motion thereof in conjunction with the power supply on winding 231 from duty cycle control channel 42 to be hereinafter further described.

If the phase of the input signal 15 is changed by 180 degrees, the phase of the output wave forms 256 and 258 will be diametrically reversed to thereby cause reversal of the motion of the servo-motor 12.

In similar manner to the travel of the control signal 15 from the transformer secondary 36 as described above, the secondary 38 will simultaneously pass a signal similar to the control signal 15 through the rectifier bridge 182, except in that it is in quadrature with the control signal 15 as a result of the phase shifting network including the center tap 180, resistor 176 and capacitor 178 arrangement with the rectifier bridge 182. This quadrature control signal will appear through the variable resistor chain 184 and the control windings 186 and 188 respectively in the magnetic amplifier 190 with an amplitude determined by the setting on the variable resistor chain 184. The rectifier bridge 182 is arranged to have the same delay characteristic as the full wave diode rectifier pair 44 so as to create in the magnetic amplifier 190 a residual output characteristic similar to that described with respect to the magnetic amplifier 52 to thereby operate in the control duty cycle generator 192 in substantially identical manner to that of the control duty cycle generator 54. Thereby, a clipped residual voltage wave pattern similar to 244 and 246 will appear through the transformer 221 at the controlled terminals of the control rectifiers 226 and 228 respectively to permit power flow during these periods through the power lines 230 and 234 to the field winding 231 in the servo-motor 12. The wave form at the servo-motor control winding 231 in this residual low signal voltage case will appear as the wave forms 260 and 262 which are similar to the wave forms 256 and 258 appearing at the control winding 146 except in that the wave forms 260 and 262 are not variable in amplitude and are in phase quadrature with the wave forms 256 and 258.

While for the present embodiment silicon rectifiers 44 and 182 were found to have sufficient voltage delay as described for the present purpose, it should be understood that where additional delay is desired, any suitable means to extend the voltage delay such as providing back bias or other suitable means may be used.

The class B amplifier 152 and class AB amplifier 150 are preferably designed to reach saturation just at or substantially at the point at which the voltage of the input control signal 15 reaches the voltage delay point in the rectifiers 44 and 182. Thereby, below such critical voltage the response of the amplifiers 152 and 160 is substantially linear so as to insure linear control of the servo-motor 12 in this low input control signal 15 voltage just described.

As the control signal 15 exceeds the voltage delay characteristic of the rectifiers 44 and 182, it causes an increase in conduction period in the magnetic amplifiers 52 and 190 so as to move the firing angle forward to, for example, a position shown by the broken lines 264 and 266 in the wave form 242. It thereby increases the conduction pattern to the servo-motor control winding 146 to a comparable position, as for example, to broken lines 268 and 270 and the pattern in the winding 231 to the broken lines 272, and 274. Such increase in conduction angle or period thereby increases the power available to the servo-motor 12 for operation on a load. The present invention as described, thereby achieves a fine linear control in the low output power and low control signal input conditions and substantially unlimited output power under high control signal conditions where large amounts of power are needed for proper operation.

Under this high input signal condition, reversal of the phase of the control signal 15 causes a reversal of the phase of the signal pattern in the amplifier 152 and a reversal in the phase of the signal appearing at the servo-motor control winding 146 to achieve a reversal in rotational movement of the servo-motor 12.

While magnetic amplifiers 52 and 190 have been used in the present embodiment as the duty cycle generators, other types of duty cycle generators such as a saw tooth generator and associated trigger circuit may also be substituted for this purpose.

This invention is not limited to the particular details of construction and operation herein described as equivalents will suggest themselves to those skilled in the art.

What is claimed is:

1. In a power amplifier control circuit for controlling alternating current power from an alternating current power source to a servomotor of the type having a pair of field control windings for alternating current power in quadrature voltage phase in one winding with respect to the other winding, the combination of a pair of duty cycle control channels, each coupled to a respective one of the servo-motor control windings, a magnetic amplifier in each of the duty cycle channels, a Scott T formation coupled to the channels for applying said alternating current power to one of the channels in quadrature phase with respect to alternating current power applied to the other channel, electronic valve means in each channel coupled to the magnetic amplifier and Scott T formation for controlling the magnitude of alternating current power flow from the associated channel to the corresponding field control winding in accordance with magnetic amplifier output, a saturable amplifier coupled to the valve means of one of the channels and the corresponding field winding of the servo-motor, and a master control signal means coupled to the magnetic amplifiers and said saturable amplifier for controlling output of said magnetic amplifiers and said saturable amplifier.

2. The combination as in claim 1 wherein the master control signal means includes means for providing a pair of master control signals in quadrature, with one power signal and one master control signal in phase with each other and the other power signal and other master control signal in quadrature with the one master and one power signals.

3. In a device for controlling alternating current power from an alternating current power source to a load in accordance with the intensity of an alternating current control signal, the combination of magnetic amplifier means including a magnetic amplifier having a firing angle determined by the control signal intensity, means for coupling said magnetic amplifier to said alternating current power source and said control signal, the control signal coupling means including voltage delay means whereby control signals below a selected intensity are blocked from said magnetic amplifier, a saturable amplifier coupled to said control signal coupling means and having an amplifying saturation at said selected control signal intensity, and means for coupling said magnetic amplifier means and saturable amplifier to said load whereby to provide power to said load from said magnetic amplifier means and said saturable amplifier.

4. In a device for controlling alternating current power from an alternating current power source to a load in accordance with the amplitude of an alternating current control signal, the combination of controlled rectifier means including a controlled rectifier having a control terminal and power input and output terminals, means for coupling the power input terminal to the power source and the power output terminal to the load, a magnetic amplifier having a control winding for receiving said control signal and an output terminal coupled to the control terminal of the controlled rectifier for causing passage of current from the power source through the controlled rectifier to the load during each firing period of the magnetic amplifier, and electronic amplifier means for receiving said control signals coupled to the output coupling means of said controlled rectifier for supplying power to the load during each conduction period of the rectifier.

5. In a device for controlling alternating current power from an alternating current power source to a load in accordance with the amplitude of an alternating current control signal, the combination of controlled electronic valve means having a control terminal and power input and output terminals, means for coupling the power input terminal to the power source and the power output terminal to the load, duty cycle generator means having an ouput coupled to said control terminal for providing a duty control conduction cycle corresponding to control signal intensity, means coupled to said duty cycle generator means for feeding said control signal to the duty cycle generator means, and electronic amplifier means for receiving said control signals coupled to the output coupling means for supplying power to the load during each conduction period of the electronic valve means.

6. The combination as in claim 5 wherein said means for feeding the control signal to the duty cycle generator includes a voltage delay means and the duty cycle generator means includes a residual cyclic output during the voltage delay period to permit operation of the electronic amplifier means for supplying power to the load during the voltage delay period.

7. In a device for controlling alternating current power from an alternating current power source to a load in accordance with the amplitude of an alternating current control signal, the combination of controlled electronic valve means having a control terminal and power input and output terminals, means for coupling the power input terminal to the power source and the power output terminal to the load, duty cycle generaor means having an output coupled to said control terminal for providing a duty control conduction cycle corresponding to control signal intensity and a residual control conduction cycle during periods of no signal intensity, means coupled to said duty cycle generator means for feeding said control signal to the duty cycle generator means and including a voltage delay means providing a selected voltage below which the control signal is blocked from the duty cycle generator, and an electronic amplifier means for receiving said control signals coupled to the output coupling means for supplying power to the load during each conduction period of the electronic valve means and having an amplifying saturation value at substantially the voltage delay value of said voltage delay means.

8. The combination as in claim 7 wherein the electronic amplifier means includes a push pull transistor amplifier having a collector terminal coupled to the power output coupling means of the controlled electronic valve means for supplying a collector voltage and thereby making the electronic amplifier means operable during each conduction period of the electronic valve means.

9. The combination as in claim 7 wherein the voltage delay means is a silicon rectifier circuit.

10. The combination as in claim 7 wherein the duty cycle generator is a magnetic amplifier circuit with a reset winding having a small residual reset characteristic sufficient to make the amplifier means operative during the voltage delay period.

11. The combination as in claim 8 wherein the amplifier means includes two electronic amplifiers in series, with the second being said push pull transistor amplifier.

12. The combination as in claim 8 wherein the amplifier means includes two amplifiers in series, one being a class AB amplifier and the other being a class B amplifier, the class B amplifier being said push pull amplifier.

13. In combination, a servo-motor having a pair of control windings for two phase alternating current duty cycle operation, a pair of duty cycle control channels, an amplifier, control signal means and alternating current power means in each of the duty cycle control channels including a duty cycle generator and a duty cycle control circuit, the duty cycle control circuits coupled to the power means and respective control winding of the servomotor, and amplifier means coupled to one of the servomotor control windings and to one of the duty cycle channels and the control signal means for supplying power to said one control winding during each duty cycle.

References Cited in the file of this patent

UNITED STATES PATENTS

| | | |
|---|---|---|
| 2,440,600 | Crosby | Apr. 27, 1948 |
| 2,545,223 | Briggs | Mar. 13, 1951 |
| 2,616,071 | Hibbard | Oct. 28, 1952 |
| 2,774,022 | Malick | Dec. 11, 1956 |
| 2,915,690 | Stroup | Dec. 1, 1959 |